United States Patent
Koyanagi (10) Patent No.: US 6,876,511 B2
(45) Date of Patent: Apr. 5, 2005

(54) DISK DRIVE AND METHOD OF DETECTING SERVO ADDRESS MARK IN THE SAME

(75) Inventor: Takahiro Koyanagi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 10/624,651

(22) Filed: Jul. 23, 2003

(65) Prior Publication Data

US 2004/0120068 A1 Jun. 24, 2004

(30) Foreign Application Priority Data

Aug. 30, 2002 (JP) ........................................ 2002-254125

(51) Int. Cl.$^7$ ............................................. G11B 21/02
(52) U.S. Cl. ....................... 360/75; 360/77.02; 360/27
(58) Field of Search ................................ 360/75, 77.02, 360/77.04, 27, 17; 375/361; 73/861.77

(56) References Cited

U.S. PATENT DOCUMENTS

| 4,982,296 A |   | 1/1991  | Brown et al. |            |
|-------------|---|---------|--------------|------------|
| 5,862,005 A | * | 1/1999  | Leis et al.  | 360/27     |
| 6,005,739 A | * | 12/1999 | Yun          | 360/77.04  |
| 6,433,948 B1| * | 8/2002  | Lee          | 360/75     |
| 6,452,990 B1| * | 9/2002  | Leis et al.  | 375/361    |
| 6,738,205 B1| * | 5/2004  | Moran et al. | 360/17     |
| 6,739,205 B2| * | 5/2004  | Vun Cannon   | 73/861.77  |

FOREIGN PATENT DOCUMENTS

| EP | 0 517 478 A2 | 12/1992 |
| GB | 2 308 488 A  | 6/1997  |
| JP | 3251804      | 11/2001 |

OTHER PUBLICATIONS

Austrian Search and Examination Reports, dated May 14, 2004 for Patent Application No. 200304159-7.

* cited by examiner

Primary Examiner—Sinh Tran
Assistant Examiner—Fred F. Tzeng
(74) Attorney, Agent, or Firm—Pillsbury Winthrop LLP (57) ABSTRACT

A detector detects, in read data, a servo address mark of a type indicated by a register. Every time a SAM is detected during a self servo process, a CPU carries out tracking control in accordance with corresponding servo data. The CPU causes a head to write a corresponding type of additional servo data item in a disk at a position offset from the position of servo data containing the detected SAM, by a predetermined distance in a circumferential direction of the disk. Every time sets of servo data, each consisting of various types of data items, are written in the disk, the head is moved by a predetermined pitch in a radial direction of the disk.

15 Claims, 8 Drawing Sheets

DISK DRIVE AND METHOD OF DETECTING SERVO ADDRESS MARK IN THE SAME

CROSS-REFERENCE TO RELATED APPLICATIONS

This application is based upon and claims the benefit of priority from the prior Japanese Patent Application No. 2002-254125, filed Aug. 30, 2002, the entire contents of which are incorporated herein by reference.

BACKGROUND OF THE INVENTION

1. Field of the Invention

The present invention relates to a disk drive that utilizes a composite head to execute a self servo write process to arrange plural sets of servo data in a circumferential direction of a disk, each set containing plural types of servo data each containing a unique type of servo address mark. In particular, the present invention relates to a disk drive suitable for detecting a target type of servo data in the disk as well as a method of detecting a servo address mark in the disk.

2. Description of the Related Art

Magnetic disk drives that use a disk (disk medium) as a recording medium are well known. Magnetic disk drives, notably small-sized magnetic disk drives, commonly use a disk having servo data embedded in a part of a recording surface. The servo data is recorded at equal intervals in a circumferential direction of the disk and radially in a radial direction of the disk. The servo data contains a servo address mark (SAM) that is a code used to determine the servo data.

The use of an exclusive writer provided with a push pin is known as a method of writing servo data in the recording surface of the disk. The servo writer using the push pin mechanically feeds a head (magnetic head). Thus, as track density increases, the servo writer using the push pin is desired to have a very high mechanical accuracy in order to feed the head with more accurate pitches. Further, the servo writer normally writes servo data when the disk is not enclosed in a housing of the magnetic disk drive (that is, when a top cover of the disk drive is open). Thus, a facility such as a clean room is required to allow the servo writer to write servo data.

Thus, in recent years, a servo data writing method called a "self servo write" has frequently been employed which can deal with the increased track density and which does not require facilities such as a clean room. This method is characterized in that the magnetic disk drive itself controls the positioning (tacking) of the head when a servo write is executed on the disk mounted in this apparatus. Various methods have been proposed as the self servo write. One of such methods is to partition servo data into a number of types (groups) in the circumferential direction of the disk in order to carry out head tracking and servo data writes. The servo data is classified into, for example, odd-number sector servo data and even-number sector servo data, or servo data for the apparatus (actual servo data) and servo data used only for the self servo write (virtual servo data). A magnetic disk drive to which this method is applied uses a composite head including a read element and a write element, as a head (magnetic head) used to write or read data in and from the disk. The read element and the write element are offset from each other in a radial direction of the disk.

In an example in which servo data is partitioned into two types including actual servo data and virtual servo data, plural sets of actual servo data and virtual servo data are arranged (recorded) in a circumferential direction of the disk using a servo data write (a self servo write process), described below. It is assumed that actual servo data and virtual servo data have been written in a disk up to a track M. In this condition, the read element of the head is used to read, for example, actual servo data from the track M. On the basis of the read actual servo data, an operation of writing virtual servo data is performed on, for example, a track N. Similarly, an operation of actual servo data is performed using virtual servo data.

In the magnetic disk drive, a signal read from the disk by the head is amplified by a head amplifier and then transmitted to a read channel IC. The signal (read signal) transmitted to the read channel IC is amplified by a variable gain amplifier (VGA). The amplified signal has its waveform shaped by a filter and is then digitalized by an analog/digital converter (ADC). The digitalized signal (read data) is transmitted to a servo address mark (SAM) detector. The servo address mark detector detects, in the read data, a servo address mark contained in servo data. The servo data is detected in the read data on the basis of detection of the servo address mark.

For servo address mark codes contained in servo data, the same codes are normally used regardless of the position (servo position) of the disk at which servo data is recorded. Alternatively, for servo address mark codes, codes that differ from each other by one servo data item may be used at the same radial position of the disk. A magnetic disk drive to which the self servo write method is applied must read only actual servo data or only virtual servo data. Thus, the magnetic disk drive must distinguish actual servo data from virtual servo data. However, if the same servo address marks are applied to both actual and virtual servo data, it is impossible to determine whether actual or virtual servo data is first detected, when a servo address mark is detected. It is thus necessary to add a code for determination to the servo data or use, for determination, a sector code contained in an address code in the servo data.

However, the method of adding a determination code to servo data requires a separate determination code in addition to servo data in the current format. In this case, the servo data becomes longer by the length of the determination code. Thus, the application of the method of adding a determination code reduces an area on the disk (data area) which can be used to record data. Further, it is not ensured that a target type of servo data, i.e. either actual servo data or virtual servo data is detected as a result of the first servo data search. In this case, a servo data search must be repeated until the target type of servo data is found.

On the other hand, with the method of determining the types of servo data using the sector code, the data area is not reduced because the sector code is already contained in address code. However, also with this method, it is not ensured that the target type of servo data is detected as a result of the first servo data search.

BRIEF SUMMARY OF THE INVENTION

According to an embodiment of the present invention, there is provided a disk drive in which plural sets of servo data are arranged in a circumferential direction of a disk, each set containing N (a natural number satisfying N>1) types of servo data each including a unique type of servo address mark and position information. This disk drive comprises a composite head, specifying means, detecting means, and first to third control means. The composite head includes a write element and a read element. The write element and the read element are offset from each other in a radial direction of the disk. The specifying means specifies, in a self servo write process utilizing the composite head, one of N types of servo address marks which is to be detected, the N types of servo address marks being contained in the respective N types of servo data. Every time the servo data items of the same type, which are included in the respective sets of servo data, are written in the disk in a circle, the specifying means switches to specification of a servo address mark unique to the type of the servo data items. The detecting means detects the servo address mark specified by the specifying means, in read data read from the disk by the read element of the composite head and then converted into digital data. In the self servo process, every time the detecting means detects the servo address mark specified by the specifying means, the first control means positions the write element of the composite head at a target radial position on the disk on the basis of position information in servo data containing the servo address mark. With the write element positioned at the target radial position on the disk, the second control means causes the write element to write a corresponding type of additional servo data item at a position offset from the position of the servo data containing the servo address mark specified by the specifying means, in the circumferential direction of the disk by a predetermined distance. The third control means moves the composite head in the radial direction of the disk by a predetermined pitch every time sets of additional servo data items are written in the disk in a circle. Each set consists of N types of servo data items.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Figure 1:
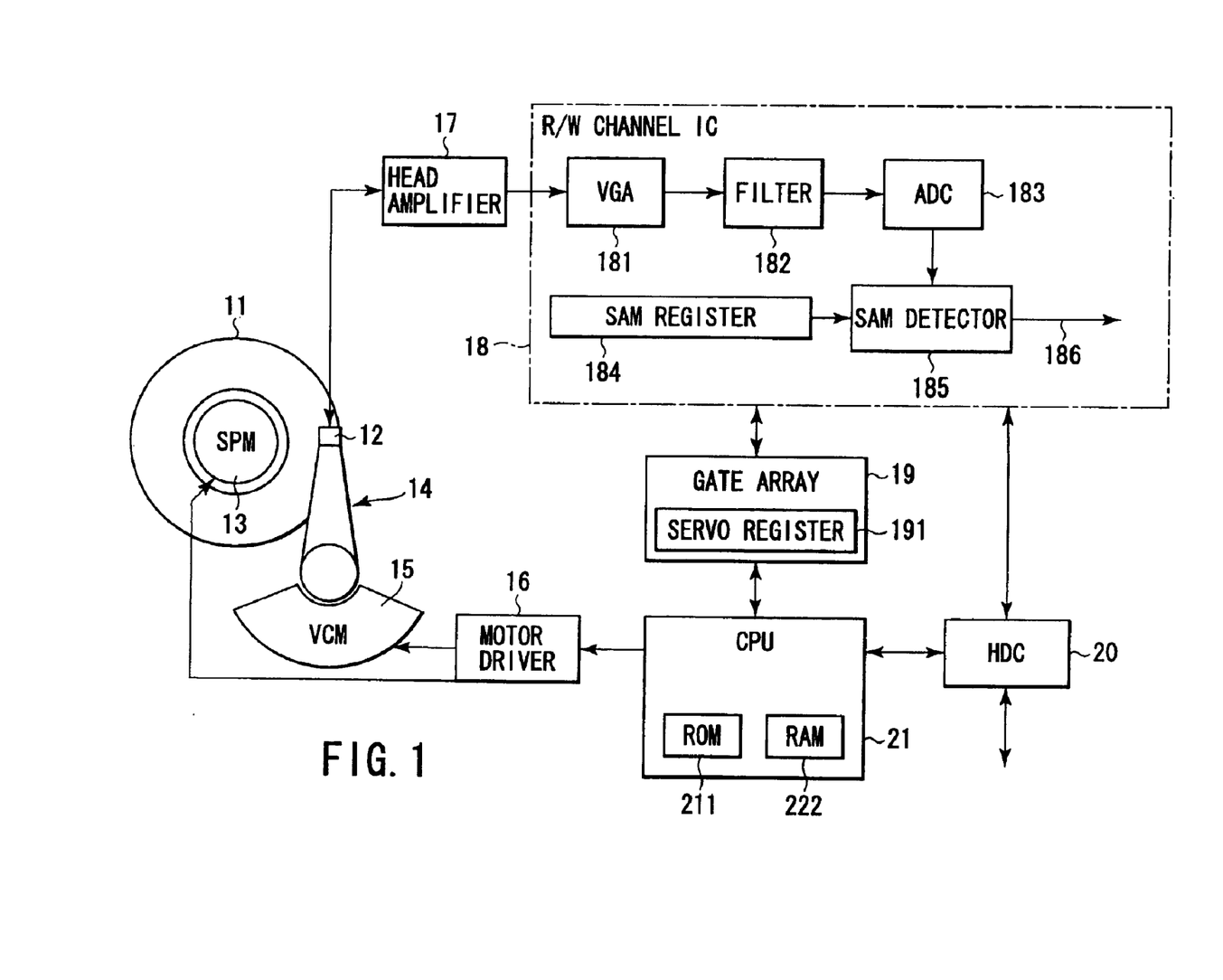
FIG. 1 is a block diagram showing a configuration of a magnetic disk drive according to an embodiment of the present invention.

The present invention will be described below in conjunction with its embodiment, with reference to the drawings. FIG. 1 is a block diagram showing a configuration of a magnetic disk drive according to an embodiment of the present invention. In a magnetic disk drive (hereinafter referred to as an "HDD"), a disk (magnetic disk) 11 is a recording medium having two disk surfaces, i.e. a top surface and a bottom surface. At least one of top and bottom surfaces of the disk (magnetic disk) 11, e.g. both disk surfaces constitute recording surfaces on which data is magnetically recorded. Heads (magnetic heads) 12 are each arranged in association with a corresponding one of the recording surfaces of the disk 11. Each head 12 is used to write data in the disk 11 (data recording) and read data from the disk 11 (data reproduction). The head 12 is a composite head including a read element (R) 121 (see FIGS. 4A to 4D) and a write element (W) 122 (see FIGS. 4A to 4D). The read element 121 is composed of an MR (magneto resistive) element. The write element 122 is composed of an inductive thin-film element. In the configuration in FIG. 1, an HDD comprising the single disk 11 is assumed. However, a plurality of disks 11 may be stacked together in the HDD.

Servo data is written in each recording surface of the disk 11 using the corresponding head 12 and a procedure described later. Areas in which servo data is written are arranged radially from the center of the disk 11 at equal intervals in the circumferential direction of the disk 11. The interval between adjacent servo areas in the circumferential direction of the disk are called a "servo interval". In the present embodiment, N (a natural number satisfying N>1) types of servo data are written in the disk 11.

Figure 2:
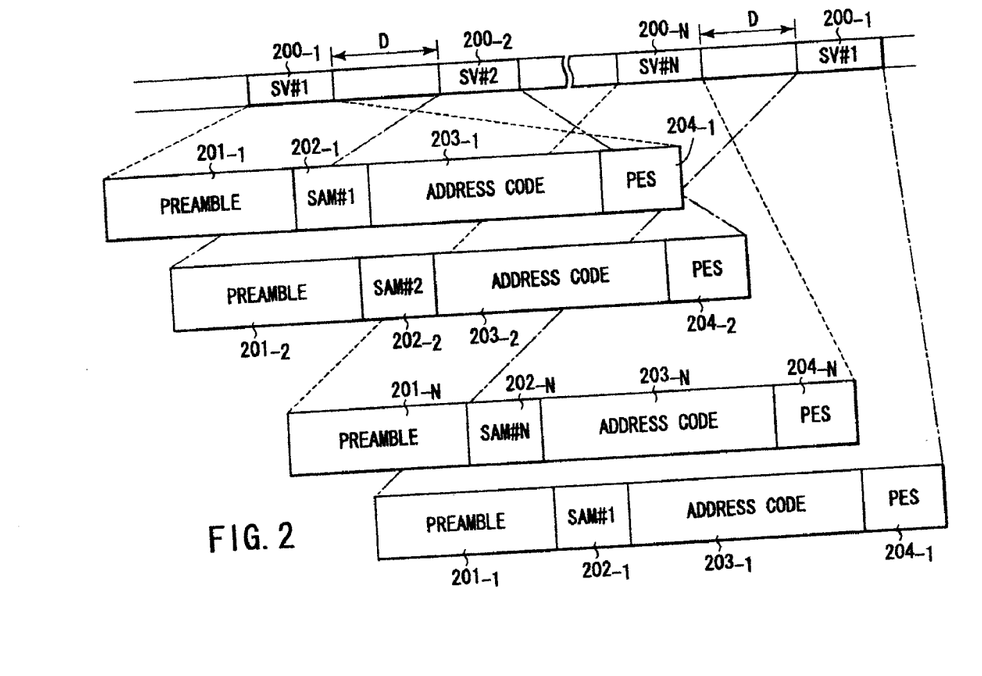
FIG. 2 is a diagram showing N types of data recorded on a recording surface of a disk 11 at the same radial positions as well as a data format.

The N types of servo data will be described below. FIG. 2 shows servo data recorded on the recording surface of the disk 11 at the same radial positions. As is apparent from FIG. 2, areas (servo areas) in which N types of servo data 200-1 (SV#1) to 200-N (SV#N) are recorded are alternately and repeatedly arranged on the recording surface of the disk 11 at the same radial positions at specified servo intervals D. The servo data $200_{-1}$ (SV#1) to $200_{-N}$ (SV#N) contain preambles $201_{-1}$ to $201_{-N}$, servo address marks (hereinafter referred to as "SAMs") $202_{-1}$ (SAM#1) to $202_{-N}$ (SAM#N), address codes $203_{-1}$ to $203_{-N}$, and position error signals (hereinafter referred to as "PESs") $204_{-1}$ to $204_{-N}$, respectively.

The preamble $201_{-i}$ (i=1 to N) contains an automatic gain control (AGC) signal of a specified frequency used to stabilize the amplitude of a signal. The SAM $202_{-i}$ (SAM#i) is a code (hereinafter referred to as an "SAM code") represented by a signal pattern unique to the type of the servo data $200_{-i}$.

The address code $203_{-i}$ contains a cylinder code (cylinder number) and a sector code (sector number). The cylinder code indicates a cylinder (track) position on the disk 11 in which the corresponding servo data $200_{-i}$ (SV#i) has been written. The sector code indicates the order of the corresponding servo data $200_{-i}$ (SV#i) in a sequence of servo data on the same cylinder (track). The PES$204_{-i}$ denotes a burst signal indicating, as the amplitude of a reproduced waveform, information on the relative position (position error) of the head in the cylinder in which the corresponding servo data $200_{-i}$ (SV#i) is being written.

Referring back to FIG. 1, the disk 1 is rotated at a high speed by a spindle motor (hereinafter referred to as an "SPM"). The head 12 is attached to the tip of an actuator (carriage) 14 as a head moving mechanism. The head 12 is moved in a radial direction of the disk 11 in accordance with rotative movement of the actuator 14. Thus, the head 12 is positioned on a target track. The actuator 14 has a voice coil motor (hereinafter referred to as a "VCM") acting as a driving source for the actuator 14. The actuator 14 is driven by the VCM 15. The SPM 13 and VCM 15 are driven by driving currents supplied by a motor driver (motor driver IC) 16. A CPU 21 determines values (controlled variable) used to determine the driving currents supplied to the SPM 13 and VCM 15 by the motor driver 16.

The head 12 is connected to a head amplifier (head IC) 17. The head amplifier 17 includes a read amplifier that amplifies a read signal read by the head 12 and a write amplifier that converts write data into a write current. The head amplifier 17 is connected to a read/write channel IC (hereinafter referred to as an R/W channel IC) 18. The R/W channel IC 18 has a read channel function of executing an A/D (Analog/Digital) converting process on a read signal and a process of decoding read data. The R/W channel IC 18 also has a write channel function of executing a process of encoding write data and other processes. The R/W channel IS 18 further has a function of detecting servo data in digitalized read data.

The R/W channel IC 18 includes a variable gain amplifier (hereinafter referred to as a "VGA") 181, a filter 182, an A/D (Analog/Digital) converter (hereinafter referred to as an "ADC") 183, a SAM register 184, and a SAM detector 185. The VGA 181 constitutes an automatic gain control (VGA) circuit to maintain a fixed level of a read signal amplified by the head amplifier 17 (specifically, the read amplifier in the head amplifier). The filter 182 is used to shape the waveform of an output signal from the VGA 181. The ADC 183 digitalizes this waveform-shaped read signal. The SAM register 184 is used to set a SAM code to be detected by the SAM detector 185. The SAM detector 185 detects the SAM code set by the SAM register 184, in the read data digitalized by the ADC 183. The SAM detector 185 then outputs a SAM detection signal 186. In FIG. 1, a circuit for detecting servo data in the read data digitalized by the ADC 183 is omitted. The detected servo data is transferred to a gate array 19.

The gate array 19 is an application specific integrated circuit (ASIC). The gate array 19 has a function of generating a servo gate pulse representative of the temporal position (i.e. timing) of the next servo data in response to the SAM detection signal 186 outputted by the SAM detector 185 in the R/W channel IC 18. The gate array 19 includes a servo register 191 that holds servo data transferred by the R/W channel 18. A disk controller (hereinafter referred to as an "HDC") 20 is connected to a host. The host is electronic equipment represented by a personal computer and utilizing the HDD. The HDC 20 transmits and receives commands (a write command, a read command, and the like) and data to and from the host. The HDC 20 also controls data transfers to and from the disk 11 via the R/W channel IC 18.

The CPU 21 has a nonvolatile memory, for example, a ROM (Read Only Memory) 211. Control programs executed by the CPU 21 are already stored in the ROM 201. The CPU 21 also has a RAM (Random Access Memory) 212. A part of the entire area of the RAM 212 is used as a work area for the CPU 21. The CPU 21 is a main controller for the HDD. The CPU 21 controls the motor driver 16, the R/W channel IC 18, the HDC 20, and others in accordance with the control programs stored in the ROM 211. The CPU 21 also executes positioning control (tracking control) and the like in order to position the head 12 within a target range on a target track. The tracking control is carried out on the basis of position information (cylinder codes and PESs) in the servo data held in the servo register 191 in the gate array 19. Further, the CPU 21 executes a self servo write process of using the head 12 to write servo data in the disk 11.

Figure 3:
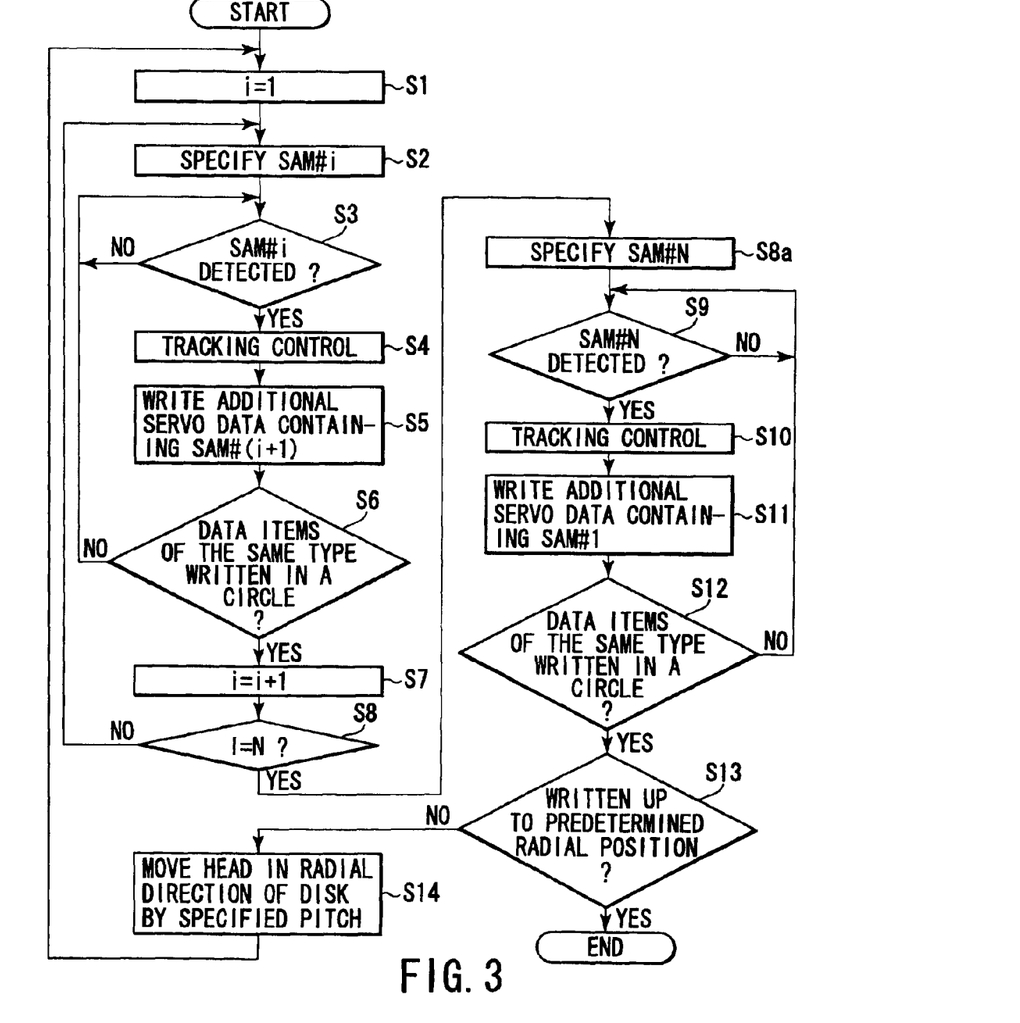
FIG. 3 is a flow chart showing a procedure of a self servo write process according to this embodiment.

Now, a self servo write process in the HDD shown in FIG. 1 will be described with reference to the flow chart in FIG. 3 and FIGS. 4A to 4D illustrating operations. In the self servo write process applied to the present embodiment, an additional pattern of servo data $200_{-1}, 200_{-2}, \ldots, 200_{-N}$ (additional servo data) is written in the disk 11 at the same radial positions. To write the additional pattern of the servo data $200_{-1}, 200_{-2}, \ldots 200_{-N}$, already written servo data $200_{-N}, 200_{-1}, \ldots 200_{-(N-1)}$ is used to carry out control for positioning the write element (W) 122 of the head 12 at a target radial position on the disk 11. Further, when the self servo write process according to the flow chart in FIG. 3 is started, plural sets of servo data each of which contains the servo data $200_{-1}, 200_{-2}, \ldots, 200_{-N}$, have already been written in the disk 11 at first radial positions. Description will be given later of the process of writing the servo data $200_{-1}, 200_{-2}, \ldots, 200_{-N}$ at the first radial positions.

First, the CPU 21 sets a variable i for specifying the type of servo data (SAM code), to an initial value of 1 (step S1). Then, the CPU 21 sets a SAM 202-i contained in servo data 200-i, i.e. a SAM#i (SAM#i code) in the SAM register 184 in the R/W channel IC 18 via the gate array 19 (step S2).

While the disk 11 is being rotated at a high speed by the SPM 13, the head 11 floats from the disk 11 at an almost constant distance from it. In this condition, the read element (R) of the head 12 converts information recorded on the recording surface of the disk 11 into electric signals. The signal converted by the head 12, i.e. the read signal, is amplified by the read amplifier in the head amplifier 17. The amplified read signal has its amplitude maintained at a fixed level by the VGA 191 in the R/W channel IC 18. An output signal (read signal) from the VGA 181 has its high frequency components removed by the filter 182 to have its waveform shaped. The read signal having its waveform shaped by the filter 182 is digitalized (quantized) by the ADC 183.

The SAM detector 185 in the R/W channel IC 18 operates only while the gate array 19 is outputting servo gate pulses. In this operational condition, the SAM detector 185 detects, in the read data digitalized by the ADC 183, the SAM#i code (in this case, the SAM#1 code) set in the SAM register 184. Upon detecting the SAM#i code, the SAM detector 185 outputs a valid SAM detection signal 186.

The R/W channel IC 18 generates flag information containing a bit of logic "1" indicative of the start of transfer of servo data, in accordance with the SAM detection signal 186 outputted by the SAM detector 185. The R/W channel IC 18, for example, serially transfers the flag information to the gate array 19. Further, the R/W channel IC 18 detects an address code 203-i and a PES 204-i both succeeding the SAM#i code, in accordance with the SAM detection signal 186. The R/W channel IC 18 serially transfers servo data 200-i containing the detected SAM#i code (SAM 202-i), address code 203-i, and PES 204i, to the gate array 19 after the above flag information.

The gate array 19 determines the start of transfer of the servo data 200-i on the basis of a leading bit of logic "1" contained in the flag information transferred by the R/W channel IC 18. In this case, using, as a reference, the point of time when the start of transfer of the servo data 200-i was determined, the gate array 19 generates a servo gate pulse indicative of a timing for the next servo data $200_{-i}$. The gate array 19 also holds, in the servo register 191, the servo data $200_{-i}$ transferred after the flag information by the R/W channel IC 18.

When the SAM detection signal 186 is outputted by the SAM detector 185 in the R/W channel IC 18 (step S3), the CPU 21 carries out tracking control to position the write element (W) 122 of the head 12 at a target radial position on the disk 11 (step S4). This control is based on the position information in the servo data $200_{-i}$ held in the servo register 191 in the gate array 19. The position information in the servo data is cylinder codes and PESs (positional error signals).

The CPU 21 may use a servo sector pulse in place of the SAM detection signal 186 as a signal used as a trigger for the tracking control. The servo sector pulse is generated by the gate array 19 as described below. Upon determining the start of transfer of the servo data $200_{-i}$ from the R/W channel IC 18, the gate array 19 detects a SAM code from the servo data $200_{-i}$ succeeding the flag information. The gate array 19 generates a servo sector pulse using, as a reference, the point of time when the SAM code was detected. Using this servo sector pulse as an interruption signal for the CPU 21, the CPU 21 can start the tracking control on the basis of the position information in the servo data $200_{-i}$.

Furthermore, the CPU 21 carries out the tracking control on the basis of the position information in the servo data $200_{-i}$ to position the write element 122 of the head 12 at the target radial position on the disk 11. Then, the CPU 11 causes the write element 122 to write additional servo data (servo pattern) containing the SAM#(i+1) code in the disk 11 a specified time later using, as a reference, a servo gate pulse as a timing pulse corresponding to the servo data $200_{-i}$ (step S5). This specified time corresponds to the servo interval D in the circumferential direction of the disk 11.

Figure 4A:
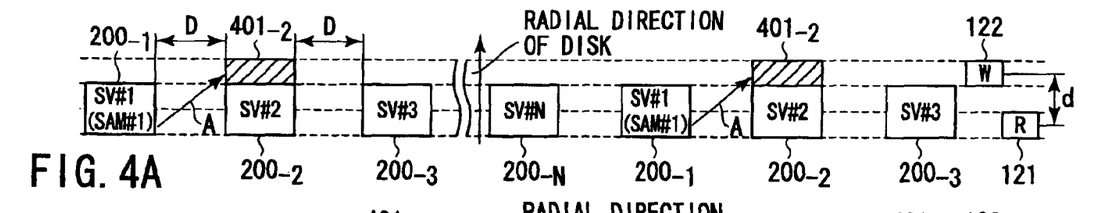
FIGS. 4A to 4D are diagrams illustrating a self servo write process according to this embodiment.

In this case, the read element 121 and write element 122, constituting the head 12, are offset from each other in the radial direction of the disk 11 by a distance d as shown in FIGS. 4A to 4D. More specifically, the write element 122 is offset from the read element 121 in a direction from inner periphery to outer periphery of the disk 11 by the distance d. Accordingly, if the write element 122 is positioned at the target radial position on the disk 11 on the basis of the servo data $200_{-i}$ (SV#i) read by the read element 121, additional servo data can be written at the position of the next servo data $200_{-(i+1)}$, which follows the servo data $200_{-i}$ and is offset from the servo data 200-$i$ in the radial direction of the disk 11 (direction from inner periphery to outer periphery of the disk 11) by the distance d. Thus, if i is 1, the read element 121 reads servo data $200_{-1}$ (SV#1), located offset from the target radial position in the radial direction of the disk 11 by the distance d as shown in FIG. 4A. Then, on the basis of the servo data $200_{-1}$ (SV#1) read by the read element 121, the write element 122 is positioned at the target radial position. In this condition, as shown by arrow A in FIG. 4A, additional servo data $401_{-2}$ is written at a position offset from the servo data $200_{-1}$ (SV#1) in the circumferential direction of the disk 11 by one servo interval D and which is also offset from the read element 121 in the radial direction of the disk 1 by the distance d. Thus, the servo data $402_{-2}$ is added to the servo data $200_{-2}$ (SV#2) already written in the disk 11. That is, the area of the written servo data $200_{-2}$ (SV#2) is extended in the radial direction of the disk 11 by the distance corresponding to the additional servo data $401_{-2}$.

Figure 4B:
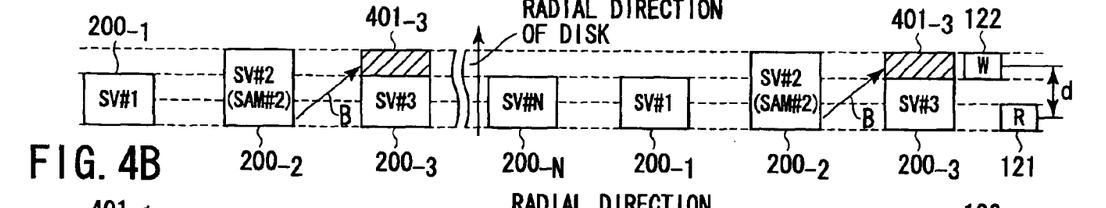
Figures 4C, 4D:
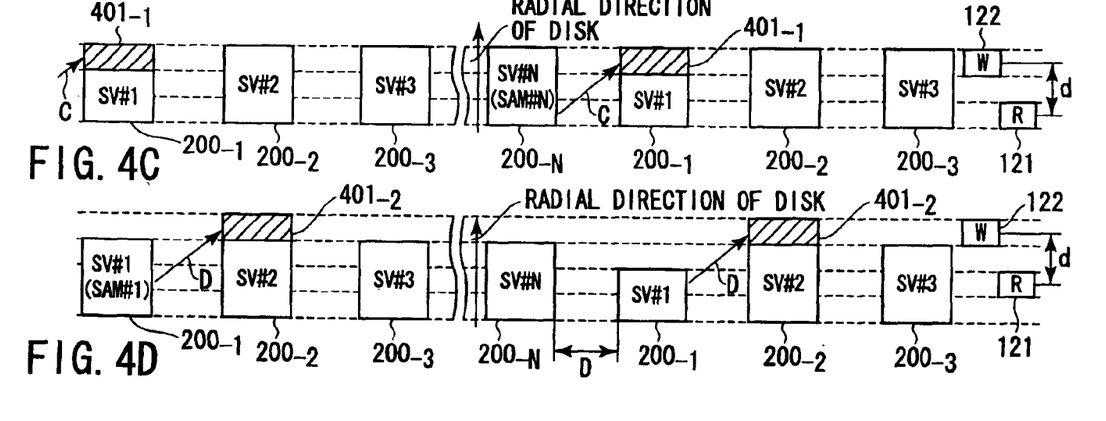

Upon writing the additional servo data item, the CPU 21 determines whether or not the additional servo data items of the same type have already been written in the disk 11 in a circle (full circle) (step S6). If the additional servo data items of the same type have not been written in the disk 11 in a circle, the CPU 21 re-executes the process starting with step S3. In contrast, once the disk 11 has rotated once to write the additional servo data items of the same type in the disk 11 in a circle, the CPU 21 increments the variable i by one (step S7). Then, the CPU 21 determines whether or not the incremented variable i equals N (step S8). If the incremented variable i does not equal N, the CPU 21 uses the incremented variable i to re-execute the process starting with step S2. If the variable i prior to the incrementation is 1 as described above, the incremented variable i is 2. Accordingly, a SAM#2 code is set in the SAM register 184. In this case, as shown in FIG. 4B, the write element 122 is positioned at the target radial position on the basis of the servo data $200_{-2}$ containing the SAM#2 code (SAM $202_{-2}$). Then, as shown by arrow B in FIG. 4B, additional servo data $401_{-3}$ is written at a position offset from the servo data $200_{-2}$ (SV#2) in the circumferential direction of the disk 11 by one servo interval D and which is also offset from the read element 121 in the radial direction of the disk 1 by the distance d. Thus, the servo data $401_{-3}$ is added to the servo data $200_{-3}$ (SV#3) already written in the disk 11. That is, the area of the written servo data $200_{-3}$ (SV#3) is extended in the radial direction of the disk 11 by the distance corresponding to the additional servo data $401_{-3}$.

On the other hand, if the incremented variable i equals N, the CPU 21 sets a SAM#N code (SAM $202_{-N}$) in the SAM register 184 in the R/W channel IC 18 (step S8a). Then, the CPU 21 waits for the SAM detector 185 in the R/W channel IC 18 to output the SAM detection signal 186 (step S9). Once the SAM detector 185 in the R/W channel IC 18 outputs the SAM detection signal 186 (step S9), the CPU 21 carries out tracking control to position the write element 122 of the head 12 at a target radial position on the disk 11 (step S10). In this case, the servo register 191 in the gate array 19 holds the servo data $200_{-N}$ (SV#N) containing the SAM#N code (SAM $202_{-N}$) specified by the SAM register 184. Accordingly, the tracking control in step S10 is based on the position information in the servo data $200_{-N}$ (SV#N).

The CPU 21 carries out the tracking control on the basis of the position information in the servo data $200_{-N}$ to position the write element 122 of the head 12 at the target radial position on the disk 11. Then, the CPU 11 causes the write element 122 to write additional servo data containing the SAM#1 code for the next servo data $200_{-1}$ (SV#1), in the disk 11 a specified time later using, as a reference, a servo gate pulse corresponding to the servo data $200_{-N}$ (SV#N) (step S11). Thus, the additional servo data is written at the position of the servo data $200_{-1}$ (SV#1), succeeding the servo data $200_{-N}$ (SV#N).

That is, if i is N, the write element 122 is positioned at the target radial position on the basis of the servo data $200_{-N}$ (SV#N) containing the SAM#N code (SAM $202_{-N}$). Then, as shown by an arrow C in FIG. 4C, additional servo data $401_{-1}$ is written at a position offset from the servo data $200_{-N}$ (SV#N) in the circumferential direction of the disk 11 by one servo interval D and which is also offset from the read element 121 in the radial direction of the disk 11 by the distance d. Thus, the servo data $401_{-1}$ is added to the servo data $200_{-1}$ (SV#1) already written in the disk 11. That is, the area of the written servo data $200_{-1}$ (SV#1) is extended in the radial direction of the disk 11 by the distance corresponding to the additional servo data $401_{-1}$.

Upon writing the additional servo data item, the CPU 21 determines whether or not the additional servo data items of the same type have already been written in the disk 11 in a circle (step S12). If the additional servo data items of the same type have not been written in the disk 11 in a circle, the CPU 21 re-executes the process starting with step S9. In contrast, once the additional servo data items of the same type are written in the disk 11 in a circle, the CPU 21 determines whether or not the servo data items have been written in the disk 11 up to a second radial positions (step S13). The second radial positions are the outermost positions on the disk at which the servo data items are written. If the servo data items have not been written up to the second radial positions, the CPU 21 moves the head 12 in the radial direction (toward the outer periphery) of the disk 11 by a predetermined pitch on the basis of, for example, the servo data $200\text{-}N$ (SV#N) containing the SAM#N code currently set in the SAM register 184 (step S14). In this case, the predetermined pitch is predefined as a value smaller than the width of the write element 122 of the head 12 in the radial direction of the disk 11. This prevents the read element 121 of the head 12 from jumping out in the radial direction of the disk 11 from the area of the already written servo data $200_{-N}$ (SV#N). Further, no gap is created between the area of the already written servo data $200_{-N}$ and the area of the additional servo data.

After the head 12 is moved in the radial direction of the disk by the predetermined pitch, the CPU 21 restarts the process starting with the above step S1. As a result, as shown by an arrow D in FIG. 4D, additional servo data $402_{-2}$ is written at a position offset from the servo data $200_{-1}$ in the circumferential direction of the disk 11 by one servo interval D and which corresponds to the result of movement, in the condition in FIG. 4C, of the write element 122 in the radial direction of the disk 11 by the predetermined pitch. Thus, the servo data $402_{-2}$ is added to the servo data $200_{-2}$ (SV#2) already written in the disk 11.

On the other-hand, if the servo data items have been written up to the second radial positions (step S13), the CPU 21 ends the self servo write process. At this time, plural sets of servo data each of which contains N types of servo data, the servo data $200_{-1}$ (SV#1) to $200_{-N}$ (SV#N), have been written (arranged) in the disk 11. In this case, each set of the servo data $200_{-1}$ (SV#1) to $200_{-N}$ (SV#N) has been written in the disk 11 radially from its first radial position to second radial position and at equal intervals (fixed servo intervals D) in the circumferential direction of disk 11.

When an HDD comprising such a disk 11 is utilized, one of the N types of servo data, the servo data $200_{-1}$ (SV#1) to $200_{-N}$ (SV#N), may be used as true servo data. In this case, the remaining servo data may be used as a dummy, and all the area of the dummy servo data may be part of the data area. Further, as an initializing process executed when the HDD is activated, the CPU may set a SAM code unique to the true servo data in the SAM register in the R/W channel IC 18.

In this manner, the self servo write process according to the present embodiment utilizes the servo data $200_{-N}$, $200_{-1}$, . . . , $200^{-(N-1)}$ already written in the disk 11 in order to position the write element 122 of the head 12 at the target radial position on the disk 11. This utilization is enabled by the presence of the offset between the read element 121 and write element 122 of the head 12 in the disk radial direction. The write element 122 is positioned at the target radial position on the basis of the servo data $200_{-N}$, $200_{-1}$, . . . , $200_{-(N-1)}$ read by the read element 121. In this condition, the write element 122 writes the additional pattern of the servo data $200_{-1}$ (SV#1), $200_{-2}$ (SV#2), . . . , $200_{-N}$ (SV#N) in the disk 11.

Thus, in the present embodiment, to detect the servo data $200_{-i}$ (SV#i) of the type to be used for tracking control, the SAM#i code (SAM $202i$) unique to that type has only to be set in the SAM register 184. The servo data of the target type can be easily detected by detecting the SAM#i code (servo address mark).

The effects of the present embodiment will be described in further detail. First, in the self servo write process according to the present embodiment, it is possible to use servo data the number of which is N times as large as that of originally required servo data. Thus, the write element 122 can be precisely positioned at the target radial position on the disk 11. Furthermore, after the self servo write process, all the area of the servo data other than the originally required servo data (true servo data) can be used as part of the data area. Thus, the data area is not reduced in spite of using the servo data the number of which is N times as large as that of originally required servo data.

In the self servo write process according to the present embodiment, while the disk 11 rotates once, it is necessary to read only one of N types of servo data, the servo data $200_{-1}$ to $200_{-N}$, recorded on the disk 11 at the same radial positions. The type of data to be read is switched every time the disk 11 rotates once. To thus read one of N types of servo data, it is necessary to be able to distinguish these types of servo data from one another.

On the other hand, conventional servo data uses the same SAM code. Thus, if a conventional servo data format if applied to N types of servo data, the servo data $200_{-1}$ (SV#1) to $200_{-N}$ (SV#7), it is impossible to determine which of the servo data $200_{-1}$ (SV#1) to $200_{-N}$ (SV#7) is first detected, when the SAM code is detected. It is thus contemplated that a code for determining the type of data may be added to the servo data or the type of data may be determined using the sector code in the address code.

However, with the method of adding a determination code to the servo data (first method), the length of the servo data is increased by the amount corresponding to this determination code. That is, this method disadvantageously reduces the area that can be used as data sectors. Further, it is not ensured that the servo data of the target type is detected during the first servo data search. Consequently, a servo data search must be repeated until the servo data of the target type is found. On the other hand, with the method of making determination using the sector code (second method), the use of existing data in the address code avoids reducing the area that can be used as data sectors. However, as in the case with the first method, it is not ensured that the servo data of the target type is detected during the first servo data search.

In contrast, in the present embodiment, different types of SAM codes are used for the respective types of servo data, i.e. the servo data that must be distinguished from one another. Further, in the present embodiment, the SAM register 184 is provided, in which the CPU 21 sets the SAM code contained in the target type of servo data. Thus, the SAM detector 185 can detect only the SAM code set in the register 184. That is, in the present embodiment, only the servo data of the target type can be detected simply by setting, in the SAM register 184, the SAM code unique to the type of servo data to be detected and without adding any new codes to the servo data. Furthermore, during the period of a self servo write process, an operation of setting the SAM code in the SAM register 184 need not be performed on the basis of the servo interval but on the basis of the time interval during which the disk rotates once. Therefore, the CPU 21 can sufficiently accomplish this operation.

Description has been given of the self servo write process according to the present embodiment. Now, description will be given of the operation of writing servo data in the disk 11 at the first radial position. The HDD in FIG. 1 has a well-known configuration in which if an attempt is made to drive the actuator 14 to move the head 12 toward the SPM 13, the operation of the actuator 14 is regulated by a stopper (not shown). When the actuator 14 is pressed against the stopper, the head 12 is positioned at the first radial position on the disk 11. That is, the head 12 can be positioned at the first radial position without relying on tracking control. The first radial position is the innermost position on the disk 11 at which servo data is written. Thus, in the present embodiment, before the self servo write process, the actuator 14 is pressed against the stopper to mechanically position the head 12 at the first radial position on the disk 11. In this condition, the CPU 21 causes the write element 122 to write sets of servo data at the first radial positions on the disk 11 spaced apart at servo intervals D. Each set of servo data consists of servo data $200_{-1}$ (SV#1) to $200_{-N}$ (SV#N).

[First Modification]

Figure 5:
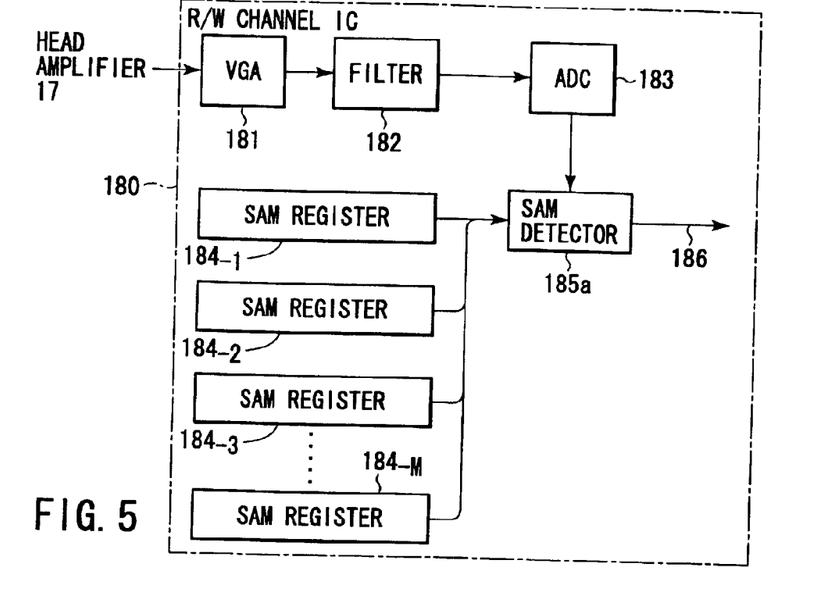
FIG. 5 is a block diagram showing a configuration of an R/W channel IC that is applied in a first modification of this embodiment.

Now, description will be given of a first modification of the embodiment of the present invention. FIG. 5 shows a configuration of an R/W channel IC 180 used in place of the R/W channel IC 18 in FIG. 1. In FIG. 5, components similar to those in FIG. 1 are denoted by the same reference numerals as those in FIG. 1. In FIG. 5, the CPU 21 sets M types of SAM codes included in the N types of SAM codes (SAM#1 to SAM#N), in M (a natural number satisfying 1<M<N) SAM registers $184_{-1}$ to $184_{-M}$ via the gate array 19. A SAM detector 185a detects, in read data digitalized by the ADC 183, the M types of SAM codes set in the SAM registers $184_{-1}$ to $184_{-M}$. The SAM detector 185 outputs the effective SAM detection signal 186 whenever one of the M types of SAM codes is detected.

Thus, in the first modification of the present embodiment, the M SAM registers $184_{-1}$ to $184_{-M}$ are provided to allow the SAM detector 185a to detect the plural (M) types of SAM codes. Consequently, when the HDD is utilized after a self servo write process, it is possible to detect, as true servo data, the M types of servo data included in the N types of servo data and set in the SAM registers $184_{-1}$ to $184_{-M}$. It is assumed that, for example, N=8, M=2, and the SAM codes SAM#1 and SAM#2 are set in the SAM register $184_{-1}$ and $184_{-2}$, respectively. In this case, of the servo data $200_{-1}$ to $200_{-8}$, the servo data 200-1 and 200-6 are detected by the SAM detector 185a.

The self servo write process according to the first modification of the present embodiment is executed using a procedure similar to that in the above embodiment. However, in this self servo write process, it is necessary to use only a predetermined one of the SAM registers 184-1 to 184-M, while setting, in the remaining SAM registers, dummy SAM codes that are not detected.

[Second Modification]

Figure 6:
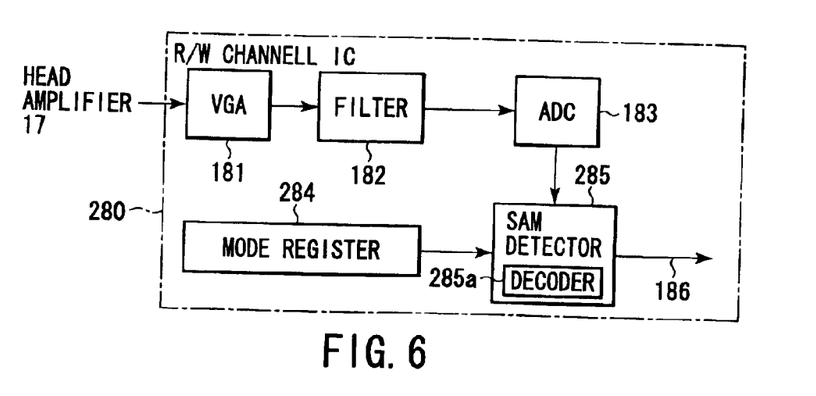
FIG. 6 is a block diagram showing a configuration of an R/W channel IC that is applied in a second modification of this embodiment.

Now, description will be given of a second modification of the embodiment of the present invention. FIG. 6 shows a configuration of an R/W channel IC 280 used in place of the R/W channel IC 18 in FIG. 1. In FIG. 6, components similar to those in FIG. 1 are denoted by the same reference numerals as those in FIG. 1. In FIG. 6, the CPU 21 sets a SAM detection mode information in a mode register 284 via the gate array 19. The SAM detection mode information specifies P (a natural number satisfying 0<P<N) types of SAM codes to be detected. The SAM detection mode information is set by the CPU 21 via the gate array 19. The SAM detector 285 includes a decoder 285a. The decoder 285a determines the P types of SAM codes to be detected by the SAM detector 285, by decoding the SAM detection mode information set in the mode register 284. The SAM detector 285 thus detects, in the read data digitalized by the ADC 183, the P types of SAM codes unique to a mode specified by the mode register 284.

Thus, in the second modification of the present embodiment, simply by switching the SAM detection mode using the mode register 284, the SAM detector 285 is allowed to detect the P types of SAM codes unique to that mode. The self servo write process according to the second modification of the present embodiment is executed using a procedure similar to that in the above embodiment. However, in this self servo write process, it is necessary to alternately and repeatedly set N types of SAM detection mode information specifying one type (for P=1) of SAM codes, i.e. N types of SAM detection mode information specifying the SAM#1 to SAM#N, one by one.

[Third Modification]

Figure 7:
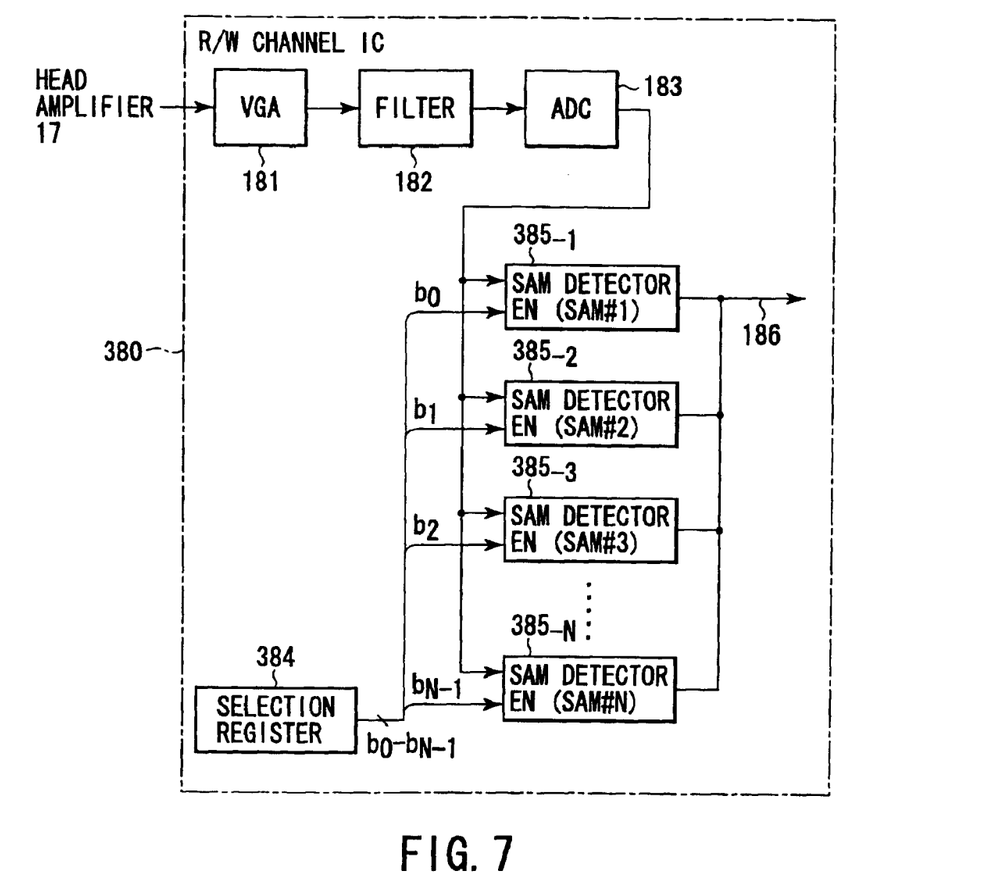
FIG. 7 is a block diagram showing a configuration of an R/W channel IC that is applied in a third modification of this embodiment.

Now, description will be given of a third modification of the embodiment of the present invention. FIG. 7 shows a configuration of an R/W channel IC 380 used in place of the R/W channel IC 18 in FIG. 1. In FIG. 7, components similar to those in FIG. 1 are denoted by the same reference numerals as those in FIG. 1. In FIG. 7, the CPU 21 sets N-bit SAM detector selection information in a selection register 384 via the gate array 19. The N-bit SAM detector selection information corresponds to N types of SAM codes. The SAM detector selection information is composed of bits $b_0$ to $b_{N-1}$. The bits $b_0$ to $b_{N-1}$ of the SAM detector selection information, set in the selection register 384, are inputted to enable terminals EN of SAM detectors $385_{-1}$ to $385_{-N}$, respectively.

When enabled, the SAM detectors $385_{-1}$ to $385_{-N}$ have functions of detecting the SAM codes SAM#1 to SAM#N, respectively. The SAM detectors $385_{-1}$ to $385_{-N}$ are enabled when their enable terminal EN has a status of logic "1". That is, the SAM detectors 385-1 to 385-N are selected if the bits $b_0$ to $b_{N-1}$, respectively, of the SAM detector selection information are "1". In this case, the SAM detectors $385_{-1}$ to $385_{-N}$ detect the SAM codes SAM#1 to SAM#N, respectively, in read data digitalized by the ADC 183. Upon detecting the SAM code unique to itself, each of the SAM detectors $385_{-1}$ to $385_{-N}$ outputs a valid SAM detection signal. The SAM detection signals from the SAM detectors $385_{-1}$ to $385_{-N}$ are wire-ORed, whereby the signal obtained by the wire-ORing is used as the SAM detection signal 186.

Thus, in the third modification of the present embodiment, by setting N-bit SAM detector selection information in the selection register 384, it is possible to select the SAM detector $385_{-i}$ corresponding to a bit of logic "1" contained in this information to detect the SAM#i code. Obviously, if only one bit of the N-bit SAM detector selection information is logic "1", it is possible to detect only one type of SAM code corresponding to this bit. Further, if plural bits of the N-bit SAM detector selection information are logic "1", it is possible to detect plural types of SAM codes corresponding to the plural bits.

[Fourth Modification]

Figure 8:
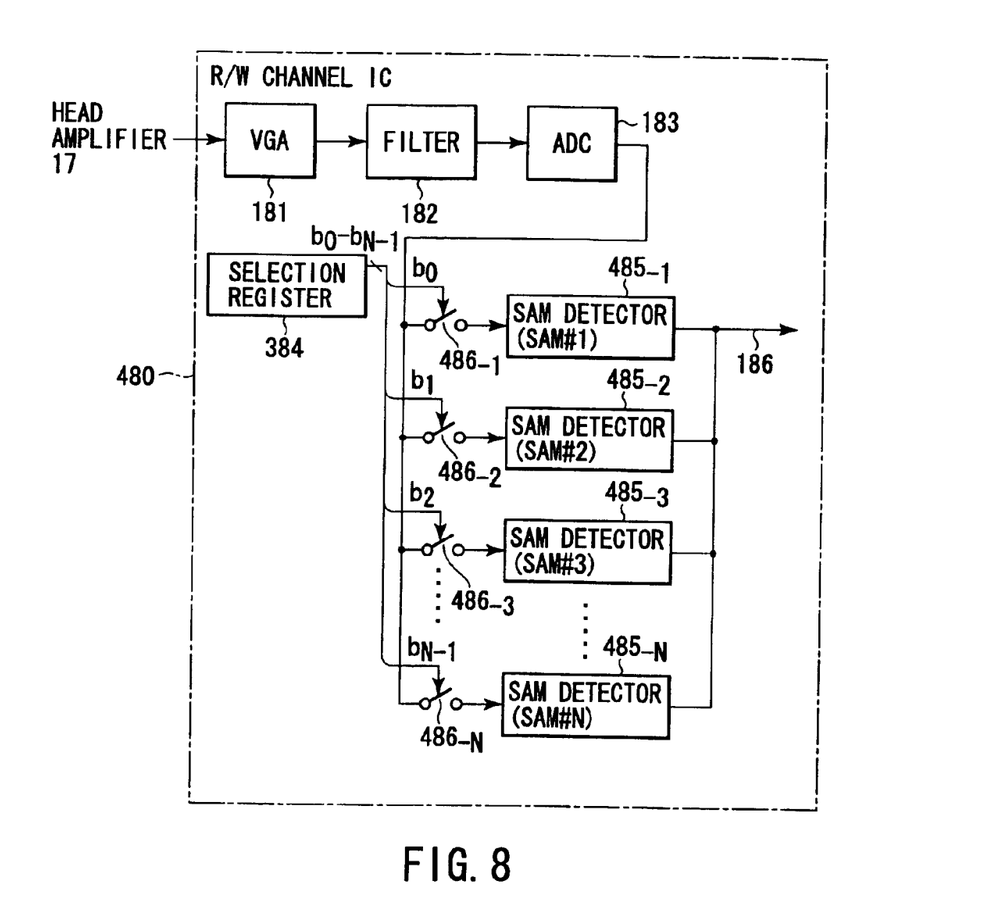
FIG. 8 is a block diagram showing a configuration of an R/W channel IC that is applied in a fourth modification of this embodiment.

Now, description will be given of a fourth modification of the embodiment of the present invention. FIG. 8 shows a configuration of an R/W channel IC 480 used in place of the R/W channel IC 18 in FIG. 1. In FIG. 8, components similar to those in FIG. 1 are denoted by the same reference numerals as those in FIG. 1. In the third modification of the present embodiment, the operation itself of the SAM detectors $385_{-1}$ to $385_{-N}$ is controlled by the bit $b_0$ to $b_{N-1}$ of the SAM detector selection information set in the selection register 384. In contrast, in the fourth modification of the present embodiment, the bits $b_0$ to $b_{N-1}$ of the SAM detector selection information controls the input of read data to the SAM detectors $485_{-1}$ to $485_{-N}$ by the ADC 183. Thus, in the fourth modification of the present embodiment, switches $486_{-1}$ to $486_{-N}$ are provided between an output of the ADC 183 and inputs of the SAM detectors $485_{-1}$ to $485_{-N}$, respectively.

The switches $486_{-1}$ to $485_{-N}$ are turned on and off (closed and opened) depending on the logic status of the bits $b_0$ to $b_{N-1}$, respectively, of the SAM detector selection information set in the selection register 384. Thus, digitalized read data outputted by the ADC 183 is inputted to the SAM detectors $485_{-1}$ to $485_{-N}$ only when the switches $486_{-1}$ to $486_{-N}$, respectively, are on. That is, the SAM detectors $485_{-1}$ to $485_{-N}$ perform a valid SAM code detecting operation only when the switches $486_{-1}$ to $486_{-N}$, respectively, are on. This is equivalent to the selection from the SAM detectors $485_{-1}$ to $485_{-N}$ based on the logic status of the bits $b_0$ to $b_{N-1}$, respectively, of the SAM detector selection information.

[Fifth Modification]

Figure 9:
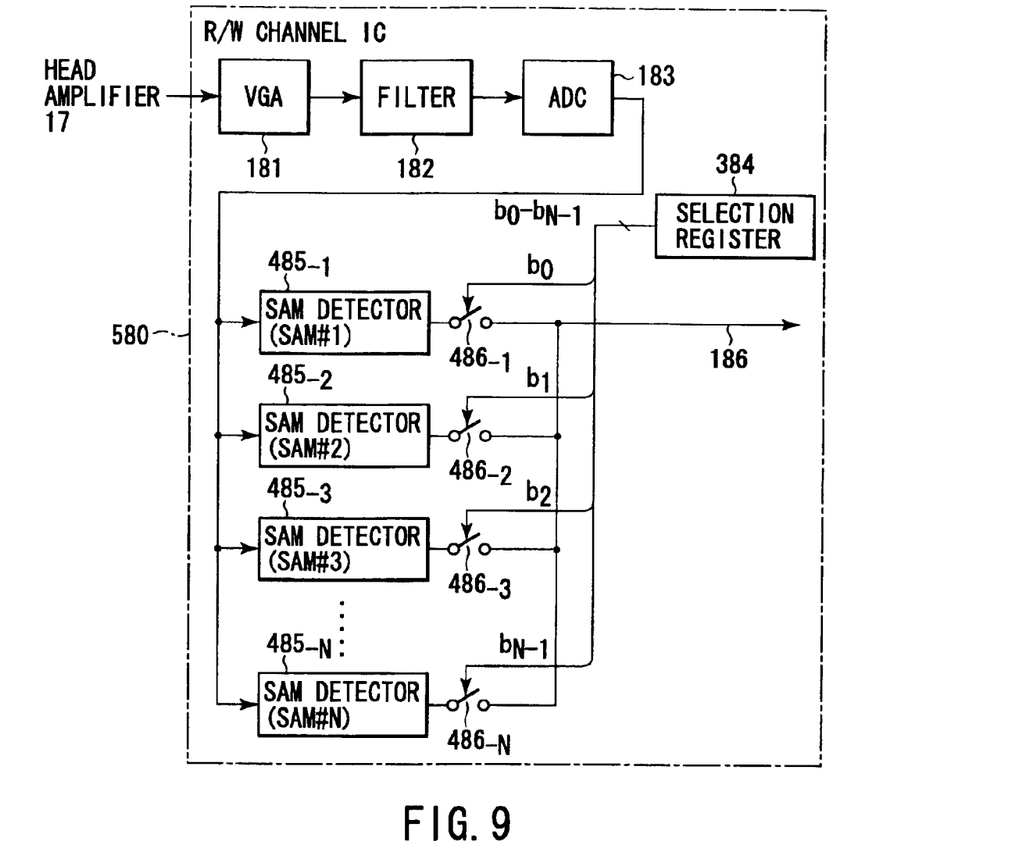
FIG. 9 is a block diagram showing a configuration of an R/W channel IC that is applied in a fifth modification of this embodiment.

Now, description will be given of a fifth modification of the embodiment of the present invention. FIG. 9 shows a configuration of an R/W channel IC 580 used in place of the R/W channel IC 18 in FIG. 1. In FIG. 9, components similar to those in FIG. 1 are denoted by the same reference numerals as those in FIG. 1. The fifth modification of the present embodiment is characterized by controlling outputs of the SAM detectors $485_{-1}$ to $485_{-N}$ in contrast with the fourth modification of the present embodiment. Thus, in the fifth modification of the present embodiment, the switches $486_{-1}$ to $486_{-N}$ are provided at the outputs of the SAM detectors $485_{-1}$ to $485_{-N}$, respectively.

The SAM detectors $485_{-1}$ to $485_{-N}$ regularly perform an operation of detecting the SAM codes SAM#1 to SAM#N, respectively, in digitalized read data outputted by the ADC 183. When the SAM detectors $485_{-1}$ to $485_{-N}$ detect the SAM codes SAM#1 to SAM#N, respectively, they output a valid SAM detection signal. Only when the switches $486_{-1}$ to $486_{-N}$ are on, the valid SAM detection signals from the SAM detectors $485_{-1}$ to $485_{-N}$ pass through the switches $486_{-1}$ to $486_{-N}$, respectively, and are then wire-ORed. This is equivalent to the selection from the SAM detectors $485_{-1}$ to $485_{-N}$ based on the logic status of the bits $b_0$ to $b_{N-1}$, respectively, of the SAM detector selection information.

In the description of the embodiment and its modifications, the present invention is applied to an HDD (magnetic disk drive). However, the present invention is applicable to disk drives other than the HDD, e.g. magneto-optical disk drives, provided that these disk drives comprise a disk on which servo data must be recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive in which plural sets of servo data are arranged in a circumferential direction of a disk, each set containing N (a natural number satisfying N>1) types of servo data each including a unique type of servo address mark and position information, the disk drive comprising:

a composite head including a write element and a read element which are offset from each other in a radial direction of the disk;

means for specifying, in a self servo write process utilizing the composite head, the type of servo address mark to be detected, which is one of N types of servo address marks included in the respective N types of servo data, the specifying means operating, every time the servo data items of the same type, which are included in the respective sets of servo data, are written in the disk in a circle to switch to specification of a servo address mark unique to the type of the servo data items;

means for detecting the servo address mark specified by the specifying means, in read data read from the disk by the read element of the composite head and then converted into digital data;

first control means for operating every time, during the self servo process, the detecting means detects the servo address mark specified by the specifying means, to position the write element of the composite head at a target radial position on the disk on the basis of position information in servo data containing the servo address mark;

second control means for operating with the write element positioned at the target radial position on the disk, to cause the write element to write a corresponding type of additional servo data item in the disk at a position offset from the position of the servo data containing the servo address mark specified by the specifying means, by a predetermined distance in the circumferential direction of the disk; and third control means for moving the composite head in the radial direction of the disk by a predetermined pitch every time sets of additional servo data items are written in the disk in a circle, each set consisting of N types of data items.

2. The disk drive according to claim 1, further comprising means for holding the servo address mark specified by the specifying means, wherein the detecting means detects, in the read data, the servo address mark held by the holding means.

3. The disk drive according to claim 2, wherein the holding means includes a register which holds the servo address mark.

4. The disk drive according to claim 1, wherein after the self servo write process, the specifying means specifies up to M (a natural number satisfying 1<M<N) arbitrary types of servo address marks included in the N types of servo address marks.

5. The disk drive according to claim 4, further comprising means for holding up to M types of servo address marks specified by the specifying means, the holding means holding one type of servo address mark during the self servo write process and up to M types of servo address marks after the self servo write process, wherein the detecting means detects, in the read data, the up to M types servo address marks held by the holding means.

6. The disk drive according to claim 5, wherein:

the holding means includes M registers which can hold M types of servo address marks; and the holding means sets, during the self servo write process, one of the N types of servo address marks which is to be detected, in one of the M registers, while setting dummy servo address marks in the remaining registers, and sets, after the self servo write process, M types of servo address marks included in the N types of servo address marks, in the M registers.

7. The disk drive according to claim 1, wherein the specifying means indirectly specifies P (a natural number satisfying 0<P<N; P=1 for a self servo write process) types of servo address marks which are to be detected and which are included in the N types servo address marks, using mode information indicative of a mode unique to the P types of servo address marks; and the detecting means includes means for decoding the mode information specified by the specifying means to determine the P types of servo address marks unique to the mode indicated by the mode information, and detects the P types of servo address marks indicated by the mode information specified by the specifying means.

8. The disk drive according to claim 7, further comprising means for holding the mode information specified by the specifying means, wherein the detecting means detects, in the read data, the P types of servo address marks indicated by the mode information held by the holding means.

9. The disk drive according to claim 8, wherein:

the holding means includes a register which holds the mode information; and the detecting means detects, in the read data, the P types of servo address marks indicated by the mode information held by the register.

10. The disk drive according to claim 1, wherein the detecting means includes N servo address mark detectors which detect different types of servo address marks included in the N types of servo address marks; and the disk drive further comprises means for selecting one of the N servo address mark detectors which detects the servo address mark specified by the specifying means.

11. The disk drive according to claim 10, wherein the selecting means includes a selection register which holds servo address mark detector selection information comprising N bits corresponding to the N types of servo address marks, one of the N bits corresponding to the servo address mark of the type specified by the specifying means and representing a predetermined logical value; and each of the N servo address mark detectors is selected if the corresponding bit in the servo address mark detector selection information held in the selection register has the predetermined logical value.

12. The disk drive according to claim 11, wherein each of the N servo address mark detectors has an enable terminal connected to the corresponding bit in the servo address mark detector information held in the selection register, and is enabled if the bit represents the predetermined logical value.

13. The disk drive according to claim 11, wherein the selecting means includes N switches provided in association with the N servo address mark detectors and respective bits contained in the N-bit servo address mark detector selection information held in the selection register, and each of the N switches controls an input of the read data to the corresponding servo address mark detector in accordance with the logical value of the corresponding bit contained in the N-bit servo address mark selection information.

14. The disk drive according to claim 11, wherein the selecting means includes N switches provided in association with the N servo address mark detectors and respective bits contained in the N-bit servo address mark detector selection information held in the selection register, and each of the N switches controls an output of a detection result from the corresponding servo address mark detector.

15. A method of detecting an arbitrary servo address mark in a disk drive which utilizes a composite head including a write element and a read element to execute a self servo write process for arranging plural sets of servo data in a circumferential direction of a disk, the write element and the read element being offset each other in a radial direction of the disk, each set containing N (a natural number satisfying N>1) types of servo data each including a unique type of servo address mark and position information, the method comprising:

during the self servo write process, specifying the type of servo address mark to be detected, which is one of N types of servo address marks unique to the respective N types of servo data;

detecting the specified servo address mark in read data read from the disk by the read element of the composite head and then converted into digital data;

during the self servo process, every time the specified servo address mark is detected, positioning the write element of the composite head at a target radial position on the disk in accordance with position information in servo data containing the servo address mark;

with the write element positioned at the target radial position on the disk, using the write element to write a corresponding type of additional servo data item in the disk at a position offset from the position of the servo data containing the specified servo address mark, by a predetermined distance in the circumferential direction of the disk;

every time the additional servo data items of the same type, which are included in the respective sets of servo data, are written in the disk in a circle, re-specifying a servo address mark unique to the type of servo data items, as the servo address mark to be detected in the detecting; and moving the composite head in the radial direction of the disk by a predetermined pitch every time sets of additional servo data items are written in the disk in a circle, each set consisting of N types of servo data items.

* * * * *